United States Patent
Brown

[19]

[11] Patent Number: 5,924,079
[45] Date of Patent: Jul. 13, 1999

[54] SECURED CASH REGISTER

[76] Inventor: Betty J. Brown, 3170 Villa Marbella Cir., Reno, Nev. 89509

[21] Appl. No.: 08/720,183

[22] Filed: Sep. 25, 1996

[51] Int. Cl.⁶ ........................................................ G06F 17/60
[52] U.S. Cl. ............................................. 705/16; 235/381
[58] Field of Search ........................ 705/16–18; 235/7 R, 235/17, 7 A, 381, 383, 375; 186/59; 194/206

[56] References Cited

U.S. PATENT DOCUMENTS

| | | | |
|---|---|---|---|
| 4,070,564 | 1/1978 | Tucker | 705/14 |
| 4,310,885 | 1/1982 | Azcua et al. | 705/14 |
| 5,380,990 | 1/1995 | Baitz et al. | 235/7 R |
| 5,489,773 | 2/1996 | Kumar | 235/462 |
| 5,606,157 | 2/1997 | Awatsu et al. | 235/379 |
| 5,707,162 | 1/1998 | Kasai et al. | 400/692 |

*Primary Examiner*—Allen R. MacDonald
*Assistant Examiner*—Hani M. Kazimi
*Attorney, Agent, or Firm*—Hovey, Williams, Timmons & Collins

[57] ABSTRACT

A cash register (10) that prevents employee theft of the money contained therein and miscounting of money received from and returned to customers. The cash register broadly includes a keypad (14) for entering a sale; a sales computing device responsive to the keypad for calculating the sale; a least one currency-receiving slot (22) for receiving currency directly from a customer; an enclosed cash drawer (16) coupled with the currency-receiving slot (22) for depositing the received currency; and a least one currency-dispensing tray (38) responsive to the sales computing device for dispensing currency directly to the customer when the received currency amount exceeds the sale amount. The currency-receiving slot, the currency-dispensing tray, and the enclosed cash drawer cooperate to eliminate the need for employees to handle money received from or returned to customers.

11 Claims, 1 Drawing Sheet

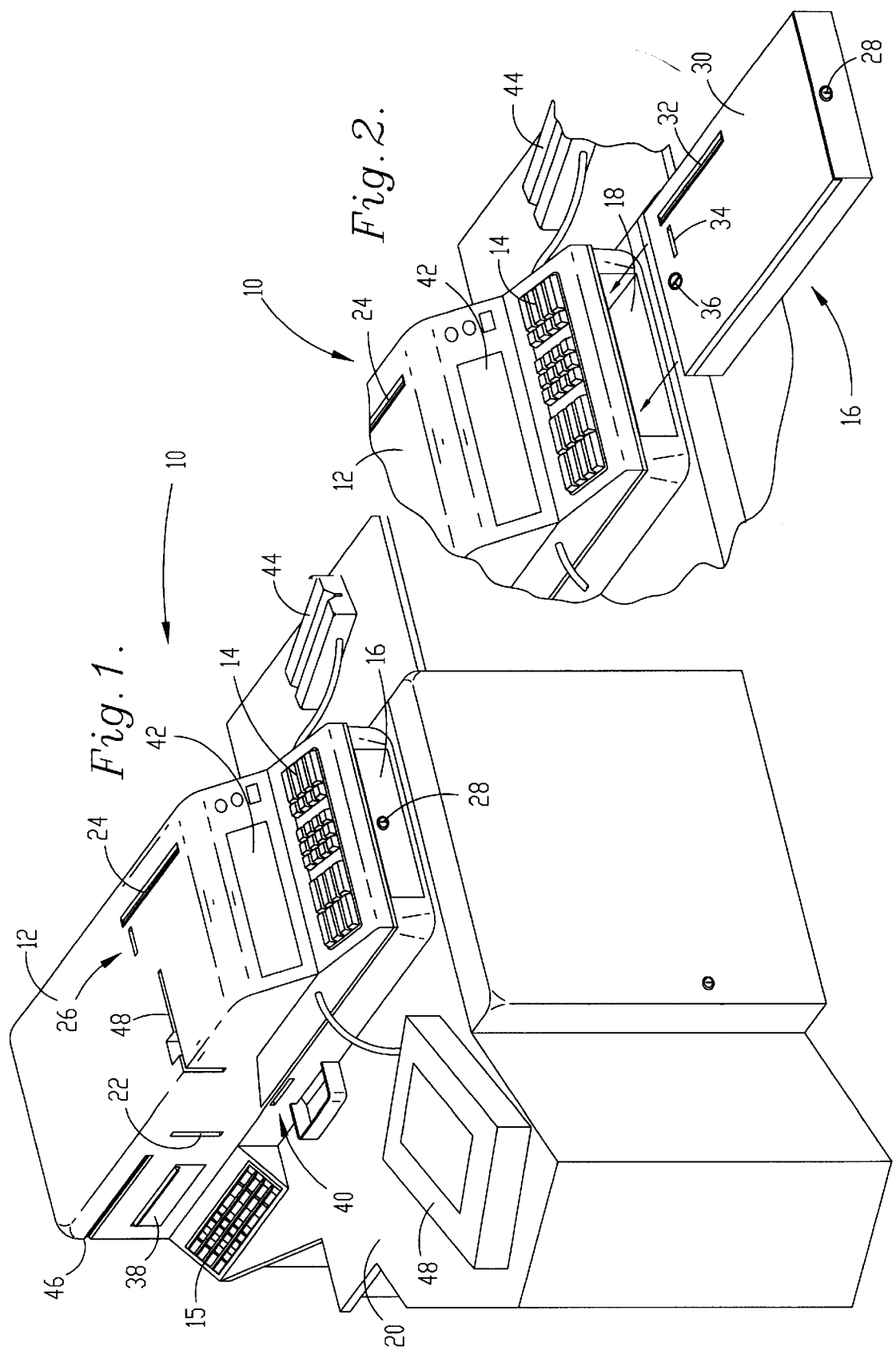

SECURED CASH REGISTER

BACKGROUND OF THE INVENTION

1. Feild of the Invention

The present invention relates to cash registers. More particularly, the invention relates to a cash register that prevents employee theft of the money contained in the register and miscounting of money received from and returned to customers.

2. Description of the Prior Art

Employee theft of money contained in cash registers and miscounting of money received from and returned to customers are sources of great losses for many businesses. These losses not only reduce the profits of the businesses, but also increase product costs for consumers.

Existing cash registers contribute to these problems because they include cash drawers that can be easily accessed by employees, thus encouraging theft. Additionally, existing cash registers do not adequately prevent miscounting of money received from and returned to customers. Although many newer cash registers calculate the amount of change to be given to customers after a sale, the employees must still remove the money from the cash registers and give the money to the customers.

SUMMARY OF THE INVENTION

The present invention solves the above-described problems and provides a distinct advance in the art of cash registers. More particularly, the present invention provides an improved cash register that prevents employee theft of money contained in the cash register and miscounting of money deposited in or taken from the cash register.

The cash register of the present invention broadly includes a keypad for entering a sale; sales computing means responsive to the keypad for calculating the sale; currency-receiving means for receiving currency directly from a customer; an enclosed cash drawer coupled with the currency-receiving means for depositing the currency received from the customer; and currency-dispensing means responsive to the sales computing means for dispensing currency directly to the customer when the received currency amount exceeds the sale amount.

Advantageously, the currency-receiving means and the currency-dispensing means receive money directly from and dispense money directly to customers so that employees never handle the money. Additionally, the cash drawer is completely enclosed and locked and thus prevents unauthorized access to the currency deposited therein. Accordingly, the cash drawer and the currency-receiving and dispensing means of the present invention cooperate to eliminate the need for employees to handle money received from or returned to customers, thus eliminating employee theft of money contained in the cash register and miscounting of money received from or returned to customers.

BRIEF DESCRIPTION OF THE DRAWING FIGURES

A preferred embodiment of the present invention is described in detail below with reference to the attached drawing figures, wherein:

FIG. 1 is a perspective view of a secured cash register constructed in accordance with a preferred embodiment of the invention showing the cash drawer received within the register; and FIG. 2 is a partial perspective view of the secured cash register showing the cash drawer removed from the register.

DETAILED DESCRIPTION OF A PREFERRED EMBODIMENT

Turning now to the drawing figures, and particularly FIG. 1, cash register 10 constructed in accordance with a preferred embodiment of the invention is illustrated. Cash register 10 is configured for use by a clerk or other employee of a store, restaurant or other business for registering sales, receiving currency from customers and dispensing currency to customers. As used herein, currency is defined as cash, coins, checks, or any other negotiable instruments.

Cash register 10 broadly includes outer housing 12, keypad 14 for entering sales by a clerk or employee, a sales computing means for calculating the sale, at least one currency-receiving means for receiving currency directly from customers, an enclosed cash drawer 16 for depositing the currency received from the customers, and at least one currency-dispensing means for dispensing currency directly to the customer.

In more detail, outer housing 12 encloses the other components of register 10 and may be any shape and formed of any suitable material. Outer housing 12 includes a drawer-receiving chamber 18 as depicted in FIG. 2 for receiving and enclosing cash drawer 16. Outer housing 12 may be positioned on a base unit 20, table, or countertop or may be configured as a stand-alone unit.

Keypad 14 may be any conventional data entry device operable for use by a clerk in entering sales information. Keypad 14 may be integrally formed in housing 12 or may be separate from the housing and electrically connected to the housing by conventional cable. Register 10 may also include a second keypad 15 positioned on one side of register 10 for use by a customer in entering sales or charge information.

The sales computing means is preferably enclosed within outer housing 12 and is responsive to keypads 14,15. The sales computing means calculates the sale amount based upon the numbers entered into keypads 14,15 and calculates the amount of money, if any, to be returned to the customer as described in more detail below. The sales computing means may be any conventional computing device such as a microprocessor-based circuit similar to those in conventional electronic cash registers.

The currency-receiving means is provided for receiving currency directly from a customer or from a clerk operating register 10 after a sale has been made and for automatically depositing the currency in cash drawer 16 as described below. The currency-receiving means preferably includes cash slots 22 and 24. Cash slot 22 is positioned on one side of housing 12 for easy access by customers, and cash slot 24 is positioned near the front of housing 12 for easy access by employees or clerks. Both cash slots are preferably similar or identical to automated cash-receiving slots found on conventional automated teller machines.

The currency-receiving means may also include one or more coin slots 26 for receiving coins from customers or clerks. Coin slot 26 is preferably similar or identical to coin-receiving slots found on conventional vending machines.

Cash slots 22,24 and coin slot 26 are operably coupled with the sales computing means and include conventional mechanisms that detect the type of currency deposited therein (i.e., whether the cash is a $1, $5, $10, bill, etc.). After money is deposited in any one of slots 22, 24, or 26, the sales computing means determines the amount of deposited money and calculate the amount of money that is to be returned to the customer.

Cash drawer 16 is removably received within chamber 18 of housing 12 and is operably coupled with the currency-receiving means for depositing the money received from customers. As best illustrated in FIG. 2, drawer 16 is preferably secured within chamber 18 by a conventional lock 28.

In one preferred embodiment of the invention illustrated in FIG. 2, drawer 16 includes a removable lid 30 secured to the base of the drawer by a conventional lock 36. Lid 36 has slots 32,34 formed therein. When cash drawer 16 is fully inserted in chamber 18 of housing 12, slots 32,34 are operably coupled with and in alignment with slots 24,26 for receiving currency deposited in the register by employees. Lid 30 may also include an additional slot in alignment with and operably coupled with slot 22 for receiving currency deposited therein by customers.

In another embodiment of the invention, the cash drawer may remain uncovered while it is enclosed within the outer housing since the housing prevents access to the inside of the drawer. This embodiment of the register includes a retaining mechanism for retaining the drawer within the housing while it is uncovered and a removable lid that can be inserted into the housing and over the top of the drawer to switch or disable the retaining mechanism to allow the drawer to be removed from the housing.

Register 10 may also include a switch positioned within chamber 18 and operably coupled with drawer 16 for sensing when the drawer has been removed from housing 12. The switch is electrically coupled with the sales computing means so that the sales computing means can calculate or total the amount of sales made whenever drawer 16 is removed from housing 12. This allows the amount of sales made during a particular shift to be automatically calculated whenever drawer 16 is removed from the register.

The currency-dispensing means dispenses currency directly to customers whenever the customer or an employee deposits currency into slots 22,24,26 that exceeds the sale amount. The currency-dispensing means preferably includes cash tray 38 and coin-dispensing slot and tray 40. Tray 38 and slot/tray 40 are preferably positioned on the same side of housing 12 as slot 22 for easy access by customers.

Cash tray 38 is preferably similar or identical to the automated currency-dispensing devices found on conventional automated teller machines. Similarly, coin-dispensing slot and tray 40 are preferably similar or identical to the automated coin-dispensing devices found on conventional vending machines or cash registers.

Cash tray 38 and coin-dispensing slot/tray 40 are operably coupled with and controlled by the sales computing means. After a sale has been registered by a clerk and currency is deposited in any of slots 22,24,26, the sales computing means determines the amount of currency received, calculates the amount of excess money that is to be returned to the customer, and directs cash tray 38 or slot/tray 40 to return the appropriate amount of money to the customer.

Register 10 may also include a conventional display 42 for displaying the amount of a sale, a pair of conventional credit card scanners 44,46 positioned near the front and side of housing 12, respectively, for reading credit cards, a conventional receipt printer 48 for printing sale receipts, and a conventional barcode scanner 48 for scanning UPC and other codes from goods being sold.

In operation, a clerk initially registers a sale by entering sales information into keypad 14 or scanning the UPC code of a product on barcode scanner 48. The sales computing means then computes the amount of the sale and displays the sale amount on display 42.

The clerk then directs the customer to pay for the goods by either depositing currency into slot 22, swiping the customer's credit card through credit card readers 44,46, or giving currency to the clerk for placement in slots 24,26. The sales computing means then determines the amount of currency that was deposited, calculates the amount of excess money that is to be returned to the customer, and directs cash tray 38 or slot and tray 40 to return the appropriate amount of money to the customer.

Since the currency-receiving means and the currency-dispensing means receive money directly from and dispense money directly to customers, and since cash drawer 16 is completely enclosed and locked, the present invention eliminates the need for employees to handle money received from or returned to customers. This eliminates employee theft of money from cash registers and miscounting of money received from and returned to customers.

At the end of a shift, an authorized person such as a manager can unlock cash drawer 16 and remove it from housing 12. The authorized person can then unlock the cash drawer, remove the currency contained in the drawer, and replace the drawer with a new, empty cash drawer.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

I claim:

1. A cash register for use by a clerk in registering a sale, receiving currency from a customer, and dispensing currency to the customer, the cash register comprising:

an outer housing including a drawer-receiving chamber;

a keypad for entering the sale;

sales computing means responsive to the keypad for calculating the sale;

currency-receiving means for receiving currency directly from the customer;

an enclosed drawer coupled with the currency-receiving means for depositing the currency received by the currency-receiving means, the drawer including means for preventing unauthorized access to the currency deposited therein, the drawer being configured for sliding receipt within the drawer-receiving chamber of the housing so that the drawer can be fully inserted within the housing when the cash register is in use and completely removed from the housing when it is desired to close the cash register;

the sales computing means being operable for calculating the amount of currency to be returned to the customer when the received currency is of an amount greater than the sale amount; and currency-dispensing means responsive to the sales computing means for dispensing currency directly to the customer when the received currency amount exceeds the sale amount.

2. The cash register as set forth in claim 1, the preventing means including a removable, locked lid covering the drawer.

3. The cash register as set forth in claim 2, the lid including a slot formed therein operably coupled with the currency-receiving means for depositing the currency received from the currency-receiving means.

4. The cash register as set forth in claim 1 further including receipt generating means responsive to the sales computing means for generating a receipt corresponding to the sale.

5. The cash register as set forth in claim 1 further including display means responsive to the sales computing means for displaying the sale.

6. The cash register as set forth in claim 1 further including scanning means coupled with the sales computing means for scanning an item to be sold for identifying the item and the price of the item.

7. The cash register as set forth in claim 1 further including credit card reading means coupled with the sale computing means for reading a credit card number.

8. The cash register as set forth in claim 1, the currency including cash, coins, and checks.

9. The cash register as set forth in claim 1, further including means for sensing that the drawer has been removed from the drawer-receiving chamber of the housing.

10. The cash register as set forth in claim 9, the means for sensing including a switch positioned within the drawer-receiving chamber of the housing for sensing the presence of the drawer within the drawer-receiving chamber.

11. The cash register as set forth in claim 10, the switch being coupled with the sales computing means and the sales computing means being configured to automatically calculate the amount of sales made with the cash register when the switch has sensed that the drawer has been removed from the drawer-receiving chamber.

\* \* \* \* \*